US012580242B2

(12) United States Patent
Jin et al.

(10) Patent No.: US 12,580,242 B2
(45) Date of Patent: Mar. 17, 2026

(54) BATTERY TEMPERATURE CONTROL APPARATUS AND METHOD FOR ELECTRIC VEHICLES

(71) Applicants: HYUNDAI MOTOR COMPANY, Seoul (KR); KIA CORPORATION, Seoul (KR)

(72) Inventors: Dae Gun Jin, Gyeonggi-do (KR); Jin Gyu Lim, Gyeongsangbuk-do (KR); Seung Myun Chung, Seoul (KR); Tae Geun Jeong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 824 days.

(21) Appl. No.: 17/811,957

(22) Filed: Jul. 12, 2022

(65) Prior Publication Data

US 2023/0020833 A1 Jan. 19, 2023

(30) Foreign Application Priority Data

Jul. 14, 2021 (KR) ........................ 10-2021-0091976

(51) Int. Cl.
*H01M 10/00* (2006.01)
*B60L 58/24* (2019.01)
(Continued)

(52) U.S. Cl.
CPC ............. *H01M 10/63* (2015.04); *B60L 58/24* (2019.02); *B60L 58/26* (2019.02); *B60L 58/27* (2019.02); *H01M 10/486* (2013.01); *H01M 10/488* (2013.01); *H01M 10/613* (2015.04); *H01M 10/615* (2015.04); *H01M 10/625* (2015.04);
(Continued)

(58) Field of Classification Search
CPC .. H01M 10/63; H01M 10/486; H01M 10/488; H01M 10/613; H01M 10/615; H01M 10/625; H01M 2220/20; H01M 10/633; B60L 58/24; B60L 58/26; B60L 58/27; B60L 2240/545; B60L 2250/16;
(Continued)

(56) References Cited

U.S. PATENT DOCUMENTS 11,085,966 B2 * 8/2021 Tsutsumi ............. G01R 31/371
2011/0080278 A1 * 4/2011 Crombez ...................... 340/438
(Continued)

FOREIGN PATENT DOCUMENTS

JP 2013201840 A * 10/2013 ............. B60K 35/00
JP 2016085804 A * 5/2016 ............. B60K 6/445
(Continued)

*Primary Examiner* — Ramya P Burgess
*Assistant Examiner* — Brittany Renee Peko

(57) ABSTRACT

A battery temperature control apparatus for electric vehicles, the battery temperature control apparatus including a temperature measurement unit configured to measure a temperature of a battery mounted in an electric vehicle, a display unit configured to display state information of the battery based on temperature information of the battery measured by the temperature measurement unit, and a controller configured to perform control such that a preconditioning function to maintain the temperature of the battery at a predetermined optimum temperature is selectively turned ON/OFF by a user based on the state information displayed on the display unit.

8 Claims, 3 Drawing Sheets

(51) Int. Cl.

| | |
|---|---|
| *B60L 58/26* | (2019.01) |
| *B60L 58/27* | (2019.01) |
| *H01M 10/48* | (2006.01) |
| *H01M 10/613* | (2014.01) |
| *H01M 10/615* | (2014.01) |
| *H01M 10/625* | (2014.01) |
| *H01M 10/63* | (2014.01) |

(52) U.S. Cl.
     CPC ..... *B60L 2240/545* (2013.01); *B60L 2250/16* (2013.01); *H01M 2220/20* (2013.01)

(58) Field of Classification Search
     CPC ......... Y02E 60/10; Y02T 10/70; B60K 35/00; B60K 35/22; B60Y 2200/91
     See application file for complete search history.

(56)                   References Cited

U.S. PATENT DOCUMENTS

| | | | |
|---|---|---|---|
| 2015/0360578 A1* | 12/2015 | Duan .................. | B60L 11/1861 |
| 2018/0108951 A1* | 4/2018 | Beuning ............. | H01M 10/443 |
| 2021/0188127 A1* | 6/2021 | Klose ...................... | B60L 58/26 |

FOREIGN PATENT DOCUMENTS

| | | | |
|---|---|---|---|
| JP | 2020013726 A | 1/2020 | |
| KR | 20200065186 A * | 6/2020 | ............... B60H 1/00 |

* cited by examiner

| TIME DISPLAY | 30 MIN, 1 HR, 10 MIN |
|---|---|
| % DISPLAY | 0%, 50%, 100% |
| SIGNAL LIGHT (COLOR) | ○ ◍ ◍ |
| TEMPERATURE DISPLAY | 0°C , 25°C , 35°C |
| ICON | ∿∿ ❄ 🌡 |

BATTERY TEMPERATURE CONTROL APPARATUS AND METHOD FOR ELECTRIC VEHICLES

CROSS-REFERENCE TO RELATED APPLICATION

This application claims under 35 U.S.C. § 119(a) the benefit of Korean Patent Application No. 10-2021-0091976 filed on Jul. 14, 2021, the entire contents of which are incorporated herein by reference.

BACKGROUND

(a) Technical Field

The present disclosure relates to a battery temperature control apparatus and method for electric vehicles, more particularly to the battery temperature control apparatus and method capable of enabling a driver to directly recognize a state of a battery and to adjust the state of the battery to a desired level through selection of an automatic or manual mode in consideration of driving and charging habits of the driver.

(b) Description of the Related Art

In recent years, electric vehicles have been considered as ideal for implementing environmentally friendly technology and solving energy-related problems, such as depletion of natural resources and climate change. Since an electric vehicle is driven using a motor configured to receive electricity and to output power, no carbon dioxide is discharged from the electric vehicle, noise from the electric vehicle is almost nonexistent, and energy efficiency of the motor is higher than energy efficiency of an internal combustion engine, and thus the electric vehicle has attracted attention as an environmentally friendly vehicle.

In the electric vehicle, direct current stored in a battery is converted into alternating current, by which a driving motor is driven, and driving force of the driving motor is transmitted to a driving wheel, whereby the electric vehicle is moved. Therefore, the battery, which provides driving force, is one of the most important parts affecting vehicle quality.

Consequently, the electric vehicle is provided with a battery management system (BMS) configured to manage an overall state of the battery. The battery management system monitors the state of the battery and provides information about charging and discharging current limit values based on battery temperature, ambient temperature, and charge state of the battery to an upper-level controller such that the vehicle is driven under an optimum condition.

In general, the electric vehicle may include a hybrid control unit (HCU) configured to control all controllers of components provided in the electric vehicle in an integrated state in order to control driving of the vehicle, a motor control unit (MCU) configured to output a torque control and speed control signal according to a control signal applied from the HCU such that a motor generates optimum driving force, to generate electricity at the time of braking control, and to constantly maintain a battery, which is a power source, in an appropriately charged state, an inverter configured to convert DC voltage of the battery into three-phase voltage and to supply the three-phase voltage to the motor by switching IGBT through pulse width modulation (PWM) control under control of MCU, and the battery management system (BMS) configured to detect current, voltage, and temperature of the battery in an operation area of the battery in order to manage the charged state of the battery.

According to the above construction, a temperature of the battery increases due to chemical reaction in the battery at the time of charging of the battery. Such an increase in temperature of the battery reduces charging capacity in comparison to a rated capacity of the battery.

If the battery is charged at an inappropriate temperature, the battery may be damaged due to overcharging thereof, and mileage of the vehicle may be reduced due to low-capacity charging. Furthermore, fast charging may not be performed, since charging output is low at low temperatures.

In charging the electric vehicle, therefore, it is important to check the state of the battery and to maintain the temperature of the battery at optimum temperature such that the battery can be charged up to the maximum capacity or to control the temperature of the battery such that high-output charging is possible.

The above information disclosed in this Background section is provided only for enhancement of understanding of the background of the disclosure and therefore it may contain information that does not form the prior art that is already known in this country to a person of ordinary skill in the art.

SUMMARY

It is an object of the present disclosure to provide a battery temperature control apparatus and method configured such that a state of a battery based on temperature-based performance characteristics of the battery is displayed, a driver monitors the displayed state of the battery, and the driver directly selects ON/OFF of a preconditioning function to optimize the temperature of the battery with regard to performance/charging in consideration of the driver's driving and charging habits, whereby, in the case in which the preconditioning function is maintained ON, a temperature for battery optimization is automatically adjusted, and when the preconditioning function is switched to an OFF state, an operation for cooling or heating the battery is selectively stopped, and therefore energy consumption is reduced and fuel economy is improved.

In order to accomplish the object, in an aspect, the present disclosure provides a battery temperature control apparatus for electric vehicles, the battery temperature control apparatus including a temperature measurement unit configured to measure a temperature of a battery mounted in an electric vehicle, a display unit configured to display state information of the battery based on temperature information of the battery measured by the temperature measurement unit, and a controller configured to perform control such that a preconditioning function to maintain the temperature of the battery at a predetermined optimum temperature is selectively turned ON/OFF by a user based on the state information displayed on the display unit.

The display unit may display the state information, including current output information of the battery, in comparison to a predetermined maximum output of the vehicle, and the current output information of the battery may be displayed on the display unit as the state information in a state of having a combination of at least one of an icon, percentage, time, temperature, or color.

The controller may perform control such that, in combining the current output information of the battery displayed on the display unit, combined items can be changed according to a request of the user.

The controller may perform control such that manipulation of the preconditioning function is performed stepwise and such that a time until the temperature of the battery reaches the optimum temperature is selectively adjusted.

The controller may selectively perform ON/OFF control of the preconditioning function by manipulation of the user through an audio video navigation (AVN) system or a cluster.

The controller may be connected to an external device such that ON/OFF control of the preconditioning function is selectively performed by manipulation of the user using the external device.

In another aspect, the present disclosure provides a battery temperature control method for electric vehicles, the battery temperature control method including a state information display step of measuring a temperature of a battery through a temperature measurement unit and displaying state information of the battery based on temperature information of the battery on a display unit, a first control step of performing control such that a preconditioning function to maintain the temperature of the battery at a predetermined optimum temperature is selectively turned ON/OFF by a user based on the state information display on the display unit, a monitoring step of monitoring the state information displayed through the display unit in real time as the preconditioning function is ON controlled in the first control step, and a second control step of determining whether ON control of the preconditioning function is maintained through monitoring of the state information.

In the state information display step and the monitoring step, the state information, including current output information of the battery, in comparison to a predetermined maximum output of a vehicle may be displayed through the display unit, and the current output information of the battery may be displayed on the display unit as the state information in a state of having a combination of at least one of an icon, percentage, time, temperature, or color.

In the first control step and the second control step, control may be performed such that manipulation of the preconditioning function is performed stepwise and such that a time until the temperature of the battery reaches the optimum temperature is selectively adjusted.

In the first control step and the second control step, ON/OFF control of the preconditioning function may be selectively performed by manipulation of the user through an audio video navigation (AVN) system or a cluster.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figures 1, 2:
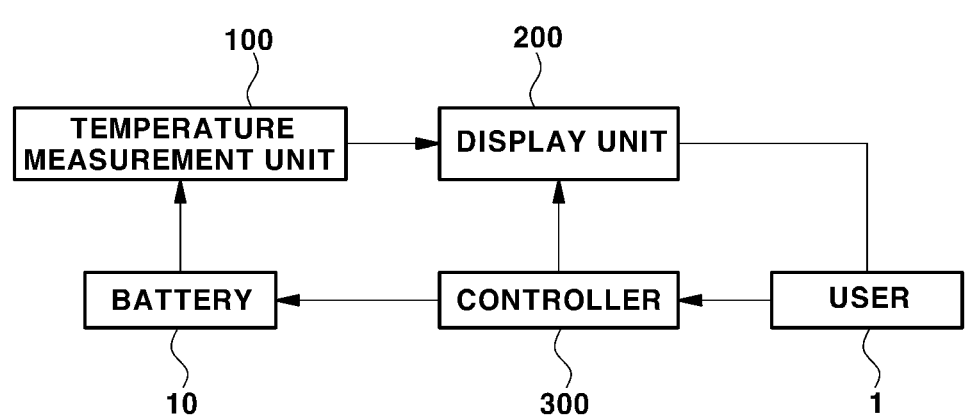
FIG. 1 is a view schematically showing the construction of a battery temperature control apparatus for electric vehicles according to an embodiment of the present disclosure.
FIG. 2 is a view showing state information of the battery temperature control apparatus for electric vehicles according to the embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to various embodiments of the present disclosure, examples of which are illustrated in the accompanying drawings and described below.

Advantages and features of the present disclosure and a method of accomplishing the same will be clearly understood from the following embodiments with reference to the attached drawings.

However, the present disclosure may be embodied in many different forms and should not be construed as limited to the embodiments set forth herein. Rather, these embodiments are provided so that the present disclosure will be thorough and complete, and will fully convey the scope of the present disclosure to those skilled in the art. The present disclosure is defined only by the category of the claims.

Also, in describing the present disclosure, a detailed description of known technologies related thereto will be omitted when the same may obscure the subject matter of the present disclosure.

Figure 3:
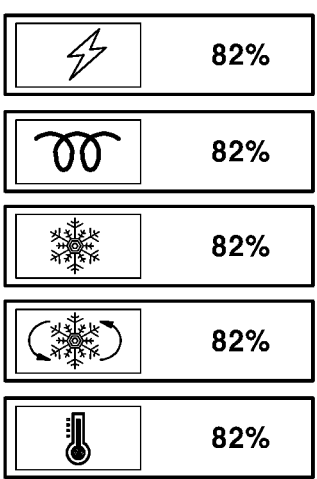
FIGS. 3 and 4 are views showing embodiments of state information of the battery temperature control apparatus for electric vehicles according to the embodiment of the present disclosure.
Figure 4:
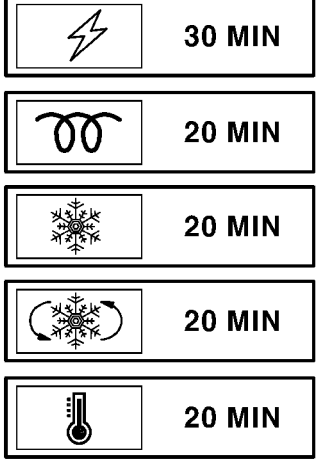

FIG. 1 is a view schematically showing the construction of a battery temperature control apparatus for electric vehicles according to an embodiment of the present disclosure, FIG. 2 is a view showing state information of the battery temperature control apparatus for electric vehicles according to the embodiment of the present disclosure, and FIGS. 3 and 4 are views showing embodiments of state information of the battery temperature control apparatus for electric vehicles according to the embodiment of the present disclosure.

As shown in FIG. 1, the battery temperature control apparatus for electric vehicles according to the embodiment of the present disclosure includes a temperature measurement unit 100, a display unit 200, and a controller 300.

The temperature measurement unit 100 is configured to measure the temperature of a battery 10 mounted in an electric vehicle, and is preferably constituted by a temperature sensor.

The display unit 200, which is provided in the vehicle, is configured to display state information of the battery 10 based on temperature information of the battery 10 measured by the temperature measurement unit 100.

The display unit 200 provides a user 1 in the vehicle with state information, output based on the current temperature information of the battery 10, in comparison to the maximum output of the vehicle through an audio video navigation (AVN) system, a cluster, a head-up display (HUD), an LED, a manual, or an information pop-up.

That is, the display unit 200 displays state information, including the current output information of the battery, in comparison to the maximum output preset differently for each vehicle. For example, when "yellow/middle/80%/35° C." is displayed on the display unit 200, the user 1 may recognize that the current output of the battery in comparison to the maximum output thereof is 80% and that estimated charging time is about 30 minutes. In addition, when "green/high/100%/25° C." is displayed on the display unit 200, the user may recognize that the current output of the battery in comparison to the maximum output set in the vehicle is 100% and that the estimated charging time is about 20 minutes.

As described above, the current output information of the battery may be displayed on the display unit 200 as state information in a state of having a combination of at least one of an icon, percentage, time, temperature, or color.

Here, as shown in FIG. 2, for example, the state information may be displayed in green, yellow, and red in a sequence of the current output of the battery in comparison to the maximum output from high to low. In addition, a combination of color and percentage, such as 100%, 70%, and 50%, may be displayed.

As shown in FIG. 3, therefore, state information in which an icon, including a gauge, and percentage are combined may be displayed through the display unit 200, such as the AVN system, the cluster, or the HUD, in the vehicle. In the state information, items combined may be changed through the controller 300 according to a request of the user 1, such as preference.

In other words, as shown in FIG. 4, state information in which an icon, including a gauge, and percentage are combined may be changed such that an icon, including a gauge, and time are combined, and the changed state information may be displayed through the display unit 200, such as the AVN system, the cluster, or the HUD, in the vehicle. Consequently, change to items that the user 1 can easily recognize is possible, whereby use convenience is improved.

A combination of a plurality of items displayed through the display unit 200 is merely an embodiment and thus is not fixed. State information may be displayed through the display unit 200 in various combinations, such as a combination of an icon, including a gauge, and temperature or a combination of color and temperature.

Meanwhile, in checking state information displayed on the display unit 200, the controller 300 performs control such that a preconditioning function to maintain the temperature of the battery 10 at a predetermined optimum temperature, such as a range of 20° C. to 30° C., is selectively turned ON/OFF according to the intention of the user 1.

In general, the preconditioning function is a function of optimizing the temperature of the battery 10 in consideration of performance/charging. In order to optimize the temperature of the battery 10, ON control is basically performed. When ON control is performed, control is performed such that the temperature of the battery 10 is maintained in a range of 20° C. to 30° C., since the temperature of the battery 10 set for optimization is within the range. As a result, operation of a related controller for cooling or heating the battery 10 may be continuously performed, whereby a decrease in fuel economy may be caused.

When the preconditioning function is OFF controlled using the controller 300 according to the intention (manipulation) of the user 1, however, control to increase or decrease the temperature of the battery 10 is not performed.

As an example, therefore, in the case in which a temperature of 10° C. is displayed as the current output information of the battery as the result of the user checking the state information of the battery 10 through the display unit 200 but it is predicted that, when the preconditioning function is OFF controlled, in other words when the user calculates time to the point in time of driving completion, the temperature of the battery 10 is increased to a range of 20° C. to 30° C. due to driving, the preconditioning function is selectively OFF controlled to selectively stop the operation of the related controller for cooling or heating the battery 10, whereby it is possible to reduce energy consumption, and therefore it is possible to improve fuel economy.

ON/OFF control of the preconditioning function may be checked by the user through the display unit 200 displayed in the AVN system or the cluster, and may be selectively performed through manipulation of an interface, such as a button or a touchscreen, according to the intention of the user 1.

In addition, the controller 300 may be connected to an external device, such as a smartphone or a tablet PC, such that ON/OFF control of the preconditioning function is selectively performed through the manipulation of the user 1 using the external device.

In addition, the controller 300 may perform stepwise manipulation in ON control of the preconditioning function, and therefore may perform control such that a time until the temperature of the battery 10 reaches an optimum temperature, e.g. a range of 20° C. to 30° C., is selectively adjusted.

For example, in the case in which the temperature of the battery 10 displayed through the display unit 200 is 10° C. and it is determined that the estimated temperature of the battery 10 until the vehicle reaches a fast charging station and is charged will not increase to the extent to which the temperature of the battery 10 reaches an optimum range, the user 1 may perform ON control in a step in which the fastest heating control is performed, among a first step, a second step, and a third step of the preconditioning function, i.e. the third step, through the controller 300 such that the temperature of the battery 10 is relatively rapidly increased to the optimum range, whereby it is possible to effectively control adjustment speed for optimizing the temperature of the battery 10.

Figure 5:
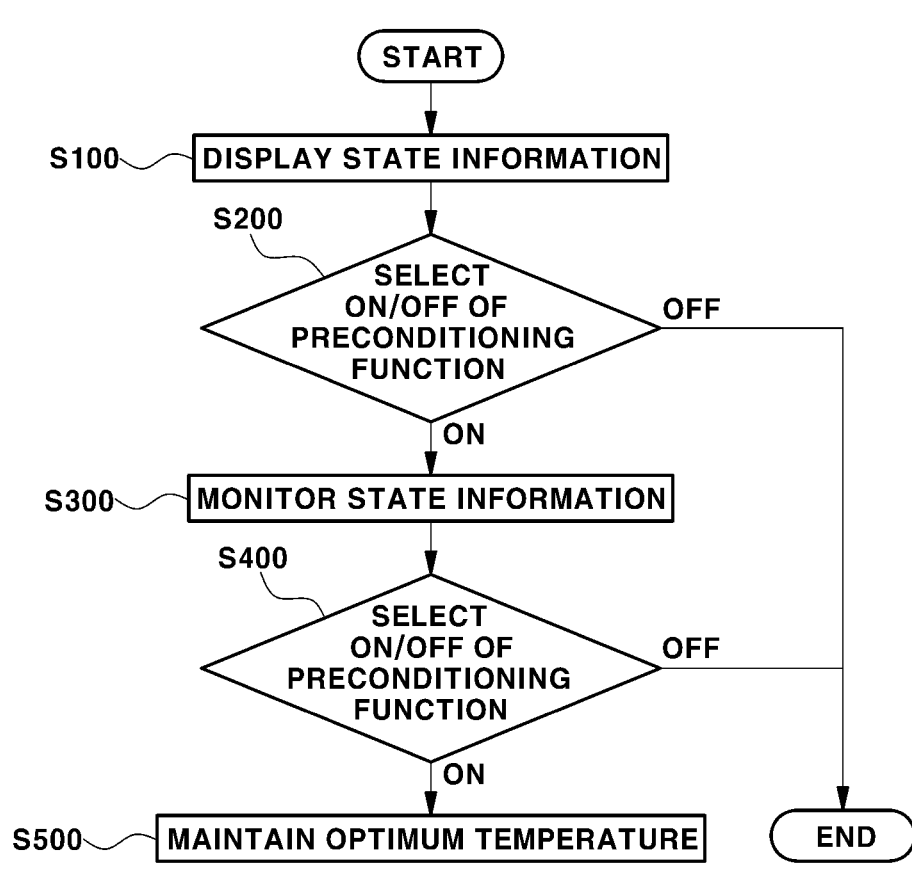
FIG. 5 is a flowchart showing a battery temperature control method for electric vehicles according to another embodiment of the present disclosure.

FIG. 5 is a flowchart showing a battery temperature control method for electric vehicles according to another embodiment of the present disclosure.

Hereinafter, the battery temperature control method for electric vehicles according to this embodiment will be described with reference to FIG. 5.

First, the temperature of a battery 10 is measured through a temperature measurement unit 100, and state information of the battery 10 output based on temperature information thereof is displayed on a display unit 200 (S100).

The display unit 200 provides a user 1 in a vehicle with state information, including the current output information of the battery 10 based on the current temperature information of the battery, in comparison to the maximum output of the vehicle through an audio video navigation (AVN) system, a cluster, a head-up display (HUD), an LED, a manual, or an information pop-up.

The current output information of the battery may be displayed on the display unit 200 as state information in a state of having a combination of at least one of an icon, percentage, time, temperature, or color (see FIG. 2).

Subsequently, the state information displayed on the display unit 200 is checked, and a controller 300 performs control such that a preconditioning function to maintain the temperature of the battery 10 at a predetermined optimum temperature is selectively turned ON/OFF according to the intention (manipulation) of the user 1 (S200).

Here, the controller 300 may perform OFF control according to the intention of the user 1 even though the state of the battery 10 is an intermediate level in an ON state of the preconditioning function. In addition, the controller may perform control such that the ON state is maintained without selective OFF control even though the state of the battery 10 is the highest level in the ON state of the preconditioning function.

In other words, in the case in which the state of the battery 10 is an intermediate level as the result of the user checking the state information of the battery 10 through the display unit 200 in the state information display step (S100), and therefore the preconditioning function must be ON controlled in order to maintain the state of the battery in the highest level through the controller 300; however, it is determined that the temperature of the battery 10 will increase during driving and will reach the highest level before driving completion as the result of the user 1 calculating time to the point in time of driving completion (the point in time at which the vehicle reaches a fast charging station), the preconditioning function may be OFF controlled according to the intention of the user 1. Consequently, it is possible to selectively stop the operation of a related controller for cooling or heating the battery 10 according to the intention of the user 1, whereby it is possible to reduce energy consumption, and therefore it is possible to improve fuel economy.

At this time, ON/OFF control of the preconditioning function (S200) may be checked by the user 1 through the display unit 200 displayed in the vehicle, such as the AVN system or the cluster, and may be selectively performed through manipulation of an interface, such as a button or a touchscreen, according to the intention of the user 1. In addition, the controller 300 may be connected to an external device, such as a smartphone or a tablet PC, such that ON/OFF control of the preconditioning function is selectively performed through the manipulation of the user 1 using the external device.

Meanwhile, since the preconditioning function is ON controlled by the controller 300 according to the intention of the user 1 in the first control step (S200), the user may monitor state information of the battery updated and displayed through the display unit 200 in real time (S300).

Here, monitoring of the state information may be achieved by the user 1 checking the state information displayed through the display unit 200 in the same manner as in the state information display step (S100).

After the user 1 checks the state information of the battery 10 in the monitoring step (S300), a determination may be performed as to whether ON control of the preconditioning function is selectively maintained (S400). In the case in which ON control is performed, the temperature of the battery 10 is continuously maintained at an optimum temperature (S500).

At this time, as previously described, when ON control of the preconditioning function is performed (S200 and S400) as the result of checking and monitoring of the state (temperature) information of the battery 10 in the state information display step (S100) and the monitoring step (S300), for example, in the case in which the temperature of the battery 10 is 10° C. and it is determined that the estimated temperature of the battery 10 until the vehicle reaches the fast charging station and is charged will not increase to the extent to which the temperature of the battery 10 reaches an optimum range, the user 1 may perform ON control in a step in which the fastest heating control is performed, among a first step, a second step, and a third step of the preconditioning function, i.e. the third step through the controller 300 such that the temperature of the battery 10 is relatively rapidly increased to the optimum range, whereby it is possible to effectively control adjustment speed for optimizing the temperature of the battery 10.

In contrast, when OFF control of the preconditioning function is performed (S200 and S400) as the result of checking and monitoring of the state (temperature) information of the battery 10 in the state information display step (S100) and the monitoring step (S300), the operation of the related controller for cooling or heating the battery 10 is selectively stopped, whereby it is possible to reduce energy consumption, and therefore it is possible to improve fuel economy.

As a result, in this embodiment, the user directly checks the state of the battery 10 and directly adjusts the temperature of the battery 10 through selective ON/OFF control of the preconditioning function, whereby it is possible to effectively prevent energy waste.

For example, on the assumption that the user 1 reaches the fast charging station and performs fast charging, when the preconditioning function is automatically ON controlled, energy necessary to drive the related controller is consumed until the optimum temperature is reached. In this embodiment, however, it may not be necessary to maintain the ON state of the preconditioning function depending on whether the user reaches the fast charging station and performs fast charging or whether the user performs slow charging at the fast charging station since the user has free time, whereby it is possible to prevent energy waste while controlling the temperature of the battery 10 at an appropriate level through change to the OFF state of the preconditioning function according to the intention of the user 1.

In this embodiment, therefore, the user checks the state of the battery 10 through the display unit 200 and directly performs ON/OFF control of the preconditioning function. As a result, heating or cooling necessary to adjust the temperature of the battery 10 is not performed, whereby energy waste is prevented and thus fuel economy is improved.

In the present disclosure, the state of the battery based on temperature-based performance characteristics of the battery is displayed, the driver monitors the displayed state of the battery, and the driver directly selects ON/OFF of the preconditioning function to optimize the temperature of the battery in the aspect of performance/charging in consideration of their driving and charging habits, whereby in the case in which the preconditioning function is maintained ON, temperature for battery optimization is automatically adjusted, when the preconditioning function is switched to the OFF state, operation for cooling or heating the battery is selectively stopped, and therefore energy consumption is reduced and fuel economy is improved.

In the present disclosure, the driver monitors the state of the battery using the audio video navigation (AVN) system, the cluster, and the head-up display (HUD), wherein intuitive monitoring through display of an icon, percentage, gauge, and color is possible and the state of the battery can be checked through a display combination preferred by the driver, whereby convenience in monitoring the state of the battery is improved.

In the present disclosure, the preconditioning function is switched (selected) to the ON state in a stepwise fashion including a first step, a second step, and a third step, whereby it is possible to control adjustment speed for optimizing the temperature of the battery.

As is apparent from the foregoing, the present disclosure has an effect in that the state of the battery based on temperature-based performance characteristics of the battery is displayed, the driver monitors the displayed state of the battery, and the driver directly selects ON/OFF of the preconditioning function to optimize the temperature of the battery in the aspect of performance/charging in consideration of their driving and charging habits, whereby in the case in which the preconditioning function is maintained ON, temperature for battery optimization is automatically adjusted, when the preconditioning function is switched to the OFF state, operation for cooling or heating the battery is selectively stopped, and therefore energy consumption is reduced and fuel economy is improved.

In addition, the present disclosure has an effect in that the driver monitors the state of the battery using the audio video navigation (AVN) system, the cluster, and the head-up display (HUD), wherein intuitive monitoring through display of an icon, percentage, gauge, and color is possible and the state of the battery can be checked through a display combination preferred by the driver, whereby convenience in monitoring the state of the battery is improved.

In addition, the present disclosure has an effect in that the preconditioning function is switched (selected) to the ON state in a stepwise fashion including a first step, a second step, and a third step, whereby it is possible to control adjustment speed for optimizing the temperature of the battery.

Although the present disclosure has been described with reference to the embodiment(s) shown in the drawings, which are merely illustrative, those skilled in the art will understand that various modifications are possible therefrom and all or some of the embodiment(s) may be selectively combined. Therefore, the real technical protection scope of the present disclosure is defined by the technical idea of the appended claims.

What is claimed is:

1. A battery temperature control apparatus for electric vehicles, the battery temperature control apparatus comprising:

a temperature measurement unit configured to measure a temperature of a battery mounted in an electric vehicle;

a display unit configured to display state information of the battery based on temperature information of the battery measured by the temperature measurement unit; and a controller configured to perform control such that a preconditioning function to maintain the temperature of the battery at a predetermined optimum temperature is selectively turned ON/OFF by a user based on the state information displayed on the display unit;

wherein the controller performs control such that manipulation of the preconditioning function is performed stepwise and such that a time until the temperature of the battery reaches the optimum temperature is selectively adjusted.

2. The battery temperature control apparatus according to claim 1, wherein:

the display unit displays the state information, comprising current output information of the battery, in comparison to a predetermined maximum output of the vehicle, and the current output information of the battery is displayed on the display unit as the state information in a state of having a combination of at least one of an icon, percentage, time, temperature, or color.

3. The battery temperature control apparatus according to claim 2, wherein the controller performs control such that, in combining the current output information of the battery displayed on the display unit, combined items can be changed according to a request of the user.

4. The battery temperature control apparatus according to claim 1, wherein the controller selectively performs ON/OFF control of the preconditioning function by manipulation of the user through an audio video navigation (AVN) system or a cluster.

5. The battery temperature control apparatus according to claim 1, wherein the controller is connected to an external device such that ON/OFF control of the preconditioning function is selectively performed by manipulation of the user using the external device.

6. A battery temperature control method for electric vehicles, the battery temperature control method comprising:

a state information display step of measuring a temperature of a battery through a temperature measurement unit and displaying state information of the battery based on temperature information of the battery on a display unit;

a first control step of performing control such that a preconditioning function to maintain the temperature of the battery at a predetermined optimum temperature is selectively turned ON/OFF by a user based on the state information display on the display unit;

a monitoring step of monitoring the state information displayed through the display unit in real time as the preconditioning function is ON controlled in the first control step; and a second control step of determining whether ON control of the preconditioning function is maintained through monitoring of the state information;

wherein, in the first control step and the second control step, control is performed such that manipulation of the preconditioning function is performed stepwise and such that a time until the temperature of the battery reaches the optimum temperature is selectively adjusted.

7. The battery temperature control method according to claim 6, wherein in the state information display step and the monitoring step, the state information, comprising current output information of the battery, in comparison to a predetermined maximum output of a vehicle is displayed through the display unit, and the current output information of the battery is displayed on the display unit as the state information in a state of having a combination of at least one of an icon, percentage, time, temperature, or color.

8. The battery temperature control method according to claim 6, wherein in the first control step and the second control step, ON/OFF control of the preconditioning function is selectively performed by manipulation of the user through an audio video navigation (AVN) system or a cluster.

\* \* \* \* \*